United States Patent Office 3,605,427
Patented Sept. 20, 1971

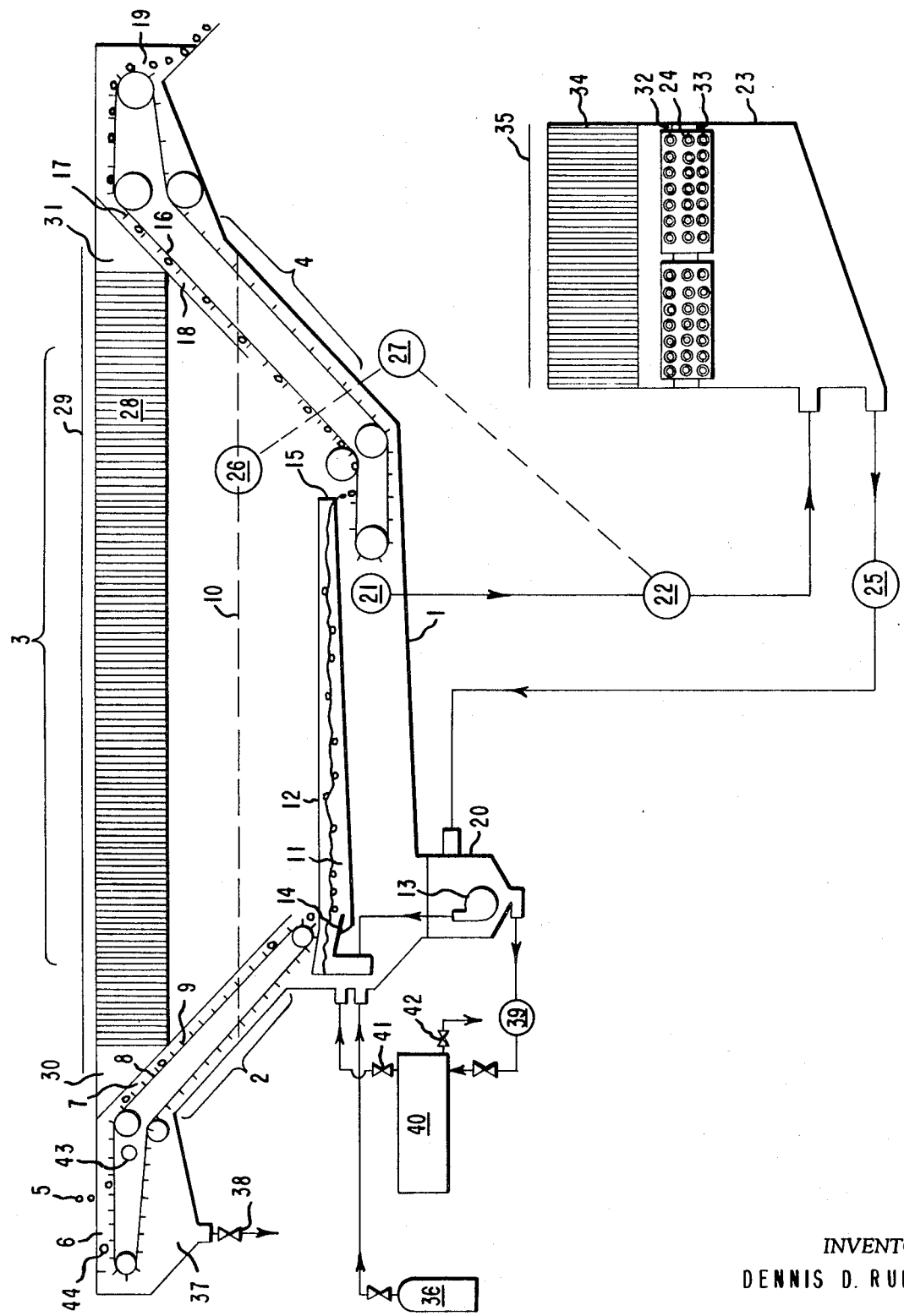

3,605,427
METHOD AND APPARATUS FOR EXTRACTING HEAT FROM ARTICLES WITH AN EBULLIENT LIQUID FREEZANT
Dennis Dale Rudy, Newark, Del., assignor to E. I. du Pont de Nemours and Company, Wilmington, Del.
Filed Dec. 10, 1969, Ser. No. 883,789
Int. Cl. F25d 17/00
U.S. Cl. 62—64                                    21 Claims

ABSTRACT OF THE DISCLOSURE

In a method, and apparatus, for extracting heat from articles, as in the freezing of food, which method comprises directly contacting the articles with an ebullient liquid freezant in an open vessel without significant loss of freezant vapor to the atmosphere, which method further comprises maintaining by means of a vapor condenser a non-condensable gas-freezant vapor interface within the vessel below the level of all paths to the outside atmosphere and above the level at which the articles come in direct contact with the liquid freezant, and introducing the articles into and removing the articles from the vessel without substantially disturbing the non-condensable gas such as air above the interface or introducing essentially any non-condensable gas below the interface, the improvement which comprises positioning said vapor condenser in an open housing remote from the vessel, conducting freezant vapor through a suitable conducting means from the vessel to the housing, maintaining a non-condensable gas-freezant vapor interface in the housing, and returning condensed freezant through a suitable conducting means to the vessel.

BACKGROUND OF THE INVENTION (1) Field of the invention

This invention relates to the extraction of heat from articles, as in the freezing of food, by directly contacting the articles with an ebullient, liquid, polyfluorinated halohydrocarbon freezant in an open vessel.

(2) Description of the prior art

It is known that food can be satisfactorily frozen by direct contact with an ebullient, liquid, fluorine-containing, halogenated alkane freezant. Robillard, in U.S. Pat. 2,059,970, teaches the freezing of food by immersion in such a freezant in a vessel which is open to the atmosphere. The disclosed vessel contains openings through which food is introduced and removed at a level intermediate between a body of liquid freezant and a vapor condenser. The freezing method is predicated upon the assumption that the freezant vapors evolved during immersion of the food in the liquid freezant are lighter than air and thus will rise to the top of the vapor space in the vessel where the vapor condenser is located. However, since the vapors of fluorine-containing, halogenated alkane freezants are heavier than air, substantial amounts of these vapors are lost by gravity flow out of the openings. Robillard suggests the use of a freezant having a boiling point of about 50° F. (10° C.), since there is less likelihood of losing much of this freezant through the openings.

In U.S. Pat. 3,368,363, Alaburda et al. disclose the freezing of food by immersion in an ebullient liquid, fluorine-containing, halogenated alkane freezant in a closed freezing vessel containing vapor locks through which the food is introduced and removed. In order to prevent loss of freezant vapor when the locks are open, Alaburda et al. suggest the use of a negative pressure within the freezing vessel, which results in the introduction of some air with the food. The freezant vapor evolved during the freezing process and air and water vapor introduced with the food are continuously withdrawn from the freezing chamber, compressed, and cooled, thereby condensing most of the water and freezant vapor. Condensed freezant is returned to the freezing chamber, while air and uncondensed freezant vapor are vented to the atmosphere. In commercial practice using the Alaburda et al. apparatus, it has been found that freezant vapor losses are undesirably high. Moreover, food is frequently damaged during closing of the vapor locks.

Waldin in U.S. Pat. 3,498,069 discloses a method of, and apparatus for, extracting heat from articles, as in the freezing of individual food particles, by direct contact with an ebullient liquid freezant in an open vessel. The vessel is equipped with a suitable condenser which, during operation of the system, provides a non-condensable gas-100% freezant vapor interface below the level of all paths to the outside atmosphere and above the level at which the articles come in direct contact with the liquid freezant. The articles are introduced into and removed from the vessel without substantially disturbing the non-condensable gas such as air above the interface and without introducing any significant amounts of non-condensable gas below the interface. Generally, the system employs long entrance and exit passageways with appropriate conveying means for introducing and removing the articles, with the openings of the passageways being above the non-condensable gas-freezant vapor interface to preclude loss of freezant. The need for long entrance and exit passageways adds to the cost of the apparatus and may sufficiently increase the headroom requirement to hamper its use in confined areas. Moreover, in cleaning said passageways, such as when foodstuffs are being frozen, sufficient heat may enter the system to warm the entire apparatus including the condensing means, thus delaying resumption of the freezing operation.

There is need, therefore, for a method and apparatus for extracting heat from articles with an ebullient liquid freezant, which method and apparatus are amenable to operation without lengthy interruptions for cleaning and without excessive loss of cooling capacity during cleaning.

SUMMARY OF THE INVENTION

It has been discovered that heat can be extracted from articles by direct contact with an ebullient liquid freezant in an open vessel wherein there is maintained a non-condensable gas-freezant vapor interface, the interface being produced and maintained by means of a condensing means which is remote from the vessel. More specifically, the present invention resides in a method which comprises (A) maintaining an ebullient, liquid, polyfluorinated, $C_1$ to $C_4$, saturated halohydrocarbon freezant in a heat extraction zone of an open heat extraction vessel, said freezant having a normal boiling point of about 5° to $-50°$ C. and a vapor density at its normal boiling point of at least about twice that of air at the same temperature, (B) controllably conducting freezant vapor from the heat extraction zone to a remotely-positioned, open housing containing a vapor condensing means, (C) maintaining a non-condensable gas-freezant vapor interface in the vessel and in the housing by operating the vapor condensing means in the housing at a temperature below the normal boiling point of the liquid freezant, the level of the interface in the vessel being below the level of all paths to the outside atmosphere which are in free vapor communication with the heat extraction zone but above the level at which the articles come in direct contact with the liquid freezant, and the level of the interface in the housing being below the level of all paths to the outside atmosphere from the interior of the housing, (D) introducing articles selected from the group consisting of liquids and solids which are at a temperature above the normal boiling point of the liquid freezant into the heat extraction zone without substantially disturbing the non-condensable gas immediately above the interfaces and without introducing any significant amount of non-condensable gas below the interfaces, (E) passing the articles through the heat extraction zone, (F) extracting heat from the articles in the heat extraction zone by direct contact with the liquid freezant, and (G) removing the articles from the vessel through an exit opening without substantially disturbing the non-condensable gas above the interfaces and without introducing essentially any non-condensable gas below the interfaces.

The method of this invention can be carried out in a heat extraction apparatus which comprises (A) an open vessel and a remotely-positioned open housing for a vapor condensing means, (B) a heat extraction zone within the vessel and containing a liquid freezant having a normal atmospheric boiling point less than ambient temperature, (C) means for introducing articles into the heat extraction zone, (D) means for conveying the articles through the heat extraction zone, (E) means within the heat extraction zone for causing the articles to come in direct contact with the liquid freezant, thereby generating freezant vapor, (F) means for conducting freezant vapor from the heat extraction zone to the vapor condenser housing, (G) vapor condensing means within the vapor condenser housing for maintaining a non-condensable gas-freezant vapor interface in the vessel and in the housing, said means being of sufficient size to condense substantially all the freezant vaporized in the heat extraction zone and conducted to the housing, the top of said means being below the level of all paths to the outside atmosphere from the interior of the housing, (H) vapor composition sensing means in the heat extraction zone for determining the level of the non-condensable gas-freezant vapor interface and for regulating the output of a vapor delivery regulating means, (I) vapor delivery regulating means operably connected to the vapor composition sensing means and the vapor conducting means for controllably conducting vapor through the vapor conducting means, (J) means for returning liquid freezant from the housing to the heat extraction zone, and (K) means for conveying the articles out of the vessel from the heat extraction zone.

BRIEF DESCRIPTION OF THE DRAWING

A schematic elevation of a simple heat extraction apparatus which employs the concepts of the present invention is included herein.

DESCRIPTION OF THE INVENTION (1) The articles

In the heat extraction method and apparatus of this invention, heat can be extracted from any liquid or solid article. Although it is expected that this invention will be used primarily for extracting heat from solid food, it is also useful in a wide variety of other applications, including the cooling or freezing of liquids, semi-solids or solids.

The term "articles" is intended to include two or more discrete particles of a single solid commodity, for example, two or more peas, or two or more packages such as boxes or pouches containing food as well as a continuous flow of a liquid or semi-solid commodity. The size of the articles is not important so long as it is coordinated with the size of the heat extraction vessel, that is, so the articles will pass through the vessel.

Most commonly, this invention will be used for the freezing of solid food. Solid foods which can be satisfactorily frozen by this invention include vegetables, such as potatoes, peas, lima beans, green beans, corn, beets, carrots, asparagus, celery, avocados, eggplant, green peppers, radishes, tomatoes and mushrooms; fruits, such as strawberries, blueberries, raspberries, apples, apricots, peaches, plums, cantaloupe, grapefruit, pineapple, cherries and grapes; meats, such as beef, pork, veal, lamb and fowl; and seafood, such as scallops, shrimp, fish, and the like.

These foods can be frozen in their natural form if desired. Large articles of food, such as corn on the cob, whole chickens, sides of beef and the like, are readily frozen in accordance with this invention. On the other hand, it is desirable in many cases to freeze foods in smaller particle sizes. Large fruits and vegetables can be sliced, diced, or cut into balls. The larger fruits, such as apples, apricots, peaches, plums and the like, can be peeled, pitted, and prepared in final portions ready for consumption, for example, in halves, quarters or smaller pieces. Berries are preferably graded, stemmed, washed, and placed in suitable condition for consumption and then immediately frozen. Chunks of meat or seafood can be cut into pieces of suitable size and shape, such as cubes, sticks, patties and the like, and then coated with appropriate materials such as bread crumbs, flour, corn meal and the like, if desired, before freezing.

The present invention also is useful in the freezing of aqueous liquids and semi-solids. Suitable liquids include fruit and vegetable juices such as orange juice, soup, broth, whole blood, aqueous pharmaceutical preparations and the like. Suitable semi-solids include mashed fruits and vegetables such as apple sauce and mashed potatoes, pastry dough, soup and the like. Moreover, the invention is useful for cooling non-aqueous liquids such as pharmaceutical tinctures and non-aqueous solids such as metal parts which are to be assembled with other parts having close tolerances.

In accordance with this invention, the articles enter the vessel at a temperature above the normal boiling point of the freezant. Under normal circumstances, the articles will enter the vessel at or above the temperature of the ambient atmosphere which is usually well above the normal boiling point of the freezant.

(2) The freezants

The heat extracting agents used in this invention extract heat from articles by direct contact with the article, thereby changing the physical state of the heat extracting agent from liquid to vapor. The terms "heat extraction" and "heat extracting" are meant to include both the chilling of articles which may or may not contain water, and the freezing of articles which contain water, including most foods. For convenience, the heat extracting agents are referred to as "freezants."

The freezants which are suitable for use in this invention are ebullient, liquid, polyfluorinated $C_1$ to $C_4$ saturated halohydrocarbons. The term "polyfluorinated halohydrocarbons" is intended to include halogen-substituted hydrocarbons containing at least two fluorine atoms. Thus, the term includes hydrocarbons in which two or more of the hydrogens are substituted by halogen. The hydrocarbon may be an alkane or a cycloalkane.

The freezants used in this invention must have normal boiling points, that is, boiling points at atmospheric pressure, between about 5° C. and —50° C. With freezants boiling above about 5° C., the chilling of articles is extremely slow. When using freezants boiling below about —50° C. the freezing of articles such as food may result in undesirable cracking. Moreover, recovery of a freezant having a boiling point below about −50° C. imposes the need for a refrigeration system more elaborate than those ordinarily used in conventional food freezing plants, thus adding to the freezing cost of such a system without any corresponding advantage. Preferably, the freezant has a normal boiling point between about −20° C. and −40° C. Because these freezants have normal boiling points below the temperature of both the articles being introduced and the ambient atmosphere, they are ebullient during use.

The freezants used in this invention must have vapor densities at their normal boiling points at least about twice that of air at the same temperature. This invention uses to advantage the greater density of the freezant vapor as compared with air. Preferably, the freezant has a vapor density at its normal boiling point at least about three times that of air at the same temperature.

Polyfluorinated, $C_1$ to $C_4$ saturated halohydrocarbons having the combination of boiling point and vapor density falling within the above-defined limits are listed in Table 1.

TABLE 1

| Freezants | Boiling point, °C. | Vapor density at boiling point/ air density at same temp. | Liquid density at boiling point, g./cc. |
|---|---|---|---|
| 1,2-dichlorotetrafluoroethane | +3.8 | 6.14 | 1.52 |
| Octafluorocyclobutane | −5.8 | 7.28 | 1.61 |
| 1,1-difluoroethane | −24.7 | 2.35 | 1.01 |
| Dichlorodifluoromethane | −29.8 | 4.36 | 1.49 |
| Chloropentafluoroethane | −38.7 | 5.55 | 1.55 |
| Chlorodifluoromethane | −40.8 | 3.10 | 1.41 |

The liquid densities of the freezants at their boiling points are given in the table. As can be seen from the densities, the freezants, with the possible exception of 1,1-difluoroethane, are all denser than food, which generally has a density of about 1.1±0.1 g./cc. Accordingly, food will generally float on the surface of the freezant, which property can be used to advantage during the heat extraction process.

Mixtures of these compounds with themselves and with other compounds also provide suitable freezants so long as the mixture has a boiling point and a vapor density within the above-defined limits. Qualified mixtures provide a means of obtaining temperatures not obtainable with single component freezants. Azeotropic mixtures, that is, mixtures which yield vapors of the same composition as the liquid, are particularly suitable. The properties of useful azeotropic mixtures are given in Table 2.

extraction zone in an open vessel without significant loss of freezant vapor to the atmosphere. By "open vessel" is meant a vessel which is open to the atmosphere, that is, contains at least one opening which allows free vapor communication between the heat extraction zone and the outside atmosphere, thus maintaining said zone essentially in pressure equilibrium with the atmosphere. Freezant losses generally do not exceed about 5 lbs. of freezant per 100 lbs. of articles passed through the system. Under the preferred conditions, freezant losses do not exceed about 2 lbs. per 100 lbs. of articles.

In the operation of the present invention a non-condensable gas freezant vapor interface is maintained within the heat extraction vessel by a vapor condensing means (synonymously referred to herein as a condenser) located in a separate housing which is open to the atmosphere and is remote from the vessel itself. The condenser housing can be above or below the heat extraction vessel. The condensing means is operated at a temperature below the normal boiling point of the liquid freezant. The interface level in the heat extraction vessel tends to rise and fall with the changing refrigeration loads and is maintained at a level below the level of all paths to the outside atmosphere which are in free vapor communication with the heat extraction zone of the vessel and at a level above that at which the articles come in direct contact with the liquid freezant. The condenser housing also contains an interface, the level of which tends to rise and fall with changing loads. The interface is maintained below the level of all paths to the outside atmosphere from the interior of the condenser housing. By the "level of a path to the outside atmosphere" is meant the highest level to which freezant vapor must rise in order to pass from the interior of the vessel and/or housing to the outside atmosphere. Most commonly the path to the outside atmosphere is an outside opening in the vessel or housing.

By "non-condensable gas" is meant a gas which is not condensable under the conditions present at the surface of the vapor condenser. Such non-condensable gas should have a density not more than one-half that of the freezant vapor at the same temperature. Under normal operation, the non-condensable gas is air which, by definition of the freezant, has the required density. In the non-condensable gas-freezant vapor interface the non-condensable gas layer is an upper layer containing any detectable amount of non-condensable gas. An interface is the highest level at which 100% freezant vapor or the lowest level at which non-

TABLE 2

| Azeotropic freezant mixtures | | Boiling point, °C. | Vapor density at boiling point/ air density at same temp. | Liquid density at boiling point, g./cc. |
|---|---|---|---|---|
| Components | Weight percent | | | |
| Dichlorodifluoromethane | 25 | −41 | 3.28 | 1.44 |
| Chlorodifluoromethane | 75 | | | |
| Chlorodifluoromethane | 49 | −46 | 3.89 | 1.50 |
| Chloropentafluoroethane | 51 | | | |
| Dichlorodifluoromethane | 74 | −33 | 3.59 | 1.33 |
| 1,1-difluoroethane | 26 | | | |

Although freezant mixtures which are not azeotropic also can be used, they are more difficult to handle since the vapors lost to the atmosphere during operation of the system will have a higher concentration of the more volatile component than the liquid freezant mixture. In order to maintain the desired boiling point of the original liquid freezant in the heat extraction vessel when using such a freezant mixture, it is necessary that the make-up freezant mixture have a higher concentration of the more volatile component than the original liquid freezant.

(3) The heat extraction system

In this invention heat can be extracted from articles by direct contact with an ebullient liquid freezant in a heat condensable gas is detected. Since the non-condensable gas is normally air, it will be referred to as air in the further discussion of this invention.

After equilibrium has been established during operation, the air above an interface contains freezant vapor in a concentration gradient which decreases from 100% at the interface to zero percent at the level of a path to the outside atmosphere. This gradient is caused by molecular diffusion of the heavier freezant vapor from the interface into the lighter air above and by circulation of the air above the interface due to thermal convection. Under operating conditions, turbulence in the area of an interface, particularly in the air above an interface, causes additional mixing of freezant vapor with the air above the interface, thus further increasing the amount of freezant vapor in this air.

Because the movement of freezant in the upward direction, as reflected by small freezant vapor losses through outside openings in the upper region of the vessel, is generally faster than the rate at which air diffuses and mixes downward into the freezant vapor below an interface, air makes no net gain in movement downward with respect to the interface. As a result, it has been found that an air-freezant vapor interface can be maintained in the heat extraction vessel and condenser housing of this invention.

The level of an air-freezant vapor interface should be maintained below the level of all paths to the outside atmosphere from the vessel or housing. Maintenance of the interface below this level avoids the loss of gross amounts of freezant vapor to the atmosphere, as would be the case if the interface were at or above the level of a path to the outside atmosphere.

The level of the air-freezant vapor interface in the heat extraction zone should be maintained above the level at which the articles come in direct contact with the liquid freezant. If the interface were maintained below the level of the direct contact, the freezant vapors evolved during heat extraction would cause turbulence in the air above the interface and would mix with the air. Maintenance of the interface above the level of the direct contact avoids this source of mixing of freezant vapor with air. The distance of the interface above the level of the direct contact is relatively unimportant provided it is sufficient that the evolved freezant vapors do not substantially disturb the interface.

The level of the interface in the heat extraction vessel is maintained by a separately housed vapor condenser located outside the heat extraction vessel. The housing is connected to the heat extraction zone within the vessel by a freezant vapor conducting means and a freezant liquid return means. Vapor is controllably conducted through the conducting means by means of a vapor delivery regulating means which delivers freezant vapor evolved in the heat extraction zone to the vapor condenser. The vapor delivery regulating means can be a fan or blower located either within the vapor conducting means or above the condenser in a path to the outside atmosphere. The vapor conducting means can be a vapor delivery conduit.

The level of the interface in the heat extraction zone is determined by a vapor composition sensing means, which regulates, through cooperation with any suitable control means, the vapor delivery regulating means as required to maintain the interface at the desired level. Any suitable vapor sensing means, such as the thermal conductivity analyzer disclosed in the aforesaid Waldin patent, can be employed. The control means can be any device which controls the operation of the vapor delivery regulating means. For example, it can be a device which turns on or off or regulates the speed of the blower (vapor delivery regulating means) in response to electrical impulses received from the thermal conductivity analyzer (vapor sensing means). The liquid freezant from the condenser is returned to the heat extraction zone by a liquid conducting means such as a conduit. The liquid can be conducted to the heat extraction zone by gravity or by pump means and is used for extracting heat from the articles by direct contact. Because the condenser housing is separate from the heat extraction vessel, it is possible to close all passages between the two enclosures and allow only the one requiring cleaning to heat up during cleaning.

In order to maintain the interface in the condenser housing below the level of all paths to the outside atmosphere, the top of the condenser is preferably located below the level of all such paths. The optimum configuration of the vapor condenser will vary depending upon the amount of fluctuation in the feed load. Under steady load conditions, that is, conditions which do not cause the interface to rise or fall, the most advantageous configuration is a tall, thin condenser which allows a reduction in the area of the interface, thereby reducing diffusion. However, under non-steady load conditions, that is, conditions which cause the interface to rise and fall, the most advantageous configuration is a condenser which is as short in the vertical direction and as long and wide in the horizontal plane as practical. This arrangement reduces the vertical distance through which the interface rises and falls during operation of the system. Reducing this vertical distance reduces the speed at which the interface moves as it responds to variations in the operating conditions of the system, with a resulting decrease in the amount of mixing above the interface. Thus, the configuration of the vapor condenser is generally a compromise between steady and non-steady load considerations. The vapor condenser can be a single unit of suitable size or a combination of two or more units.

In operating the open heat extraction system of this invention, freezant vapor losses can be reduced by maintaining the volume of air above an air-freezant vapor interface as nearly static as possible. Turbulence in this volume of air disturbs the interface with the result that the air becomes admixed with additional quantities of freezant vapor, this is, beyond the amount already present in the air because of diffusion and thermal convection.

If the previously described vapor composition sensing means and the cooperating vapor deliverly regulating means are sufficiently sensitive, substantially all the interface fluctuation in the heat extraction vessel during operation can be transferred to the vapor condenser housing.

Mixing of freezant vapor and air can be reduced by minimizing the turbulence caused by introducing and removing articles from the vessel. Articles should be introduced into the heat extraction zone without substantially disturbing the air above the interface and without introducing substantially any air below the interface. Articles should also be removed from the vessel without substantially disturbing the air above the interface.

One suitable method of introducing the articles is through an entrance opening which is in free vapor communication with the heat extraction zone. After the articles have been introduced, they are passed downward from the entrance opening through the interface and into the heat extraction zone. Free communication between the outside atmosphere and the heat extraction zone is important because it allows the freezant vapor to displace the air surrounding the articles as they pass through the interface without substantially disturbing the interface or introducing essentially any air below the interface.

Turbulence is minimized during introduction of the articles through the entrance opening by passing them slowly from the entrance opening to the interface. Suitable speeds will vary depending upon the size and shape of the articles being introduced. Generally, it is preferred that the articles move from the entrance opening to the interface at a speed not in excess of 100 feet (30.48 meters) per minute. Preferably, the articles are passed from the entrance opening to the interface at a speed of less than 50 feet (15.24 meters) per minute. Preferably, there is also no tumbling motion which would create turbulence.

The articles are preferably passed through an entrance passageway from the entrance opening to the interface. The purpose of the entrance passageway is to somewhat limit the open area in the entrance zone, thereby reducing convection currents and the volume of air pushed out of the entrance opening under non-steady load conditions. The passageway also tends to reduce the effect of ambient air currents. This passageway, however, should not restrict free vapor communication between the heat extraction zone and the entrance opening.

A number of conveying means can be used to convey the articles from the entrance opening to the heat extraction zone. Suitable conveyors for handling solid articles include belt conveyors, such as wire mesh and other foraminous belts and impervious belts, auger type conveyors, short stroke vibratory conveyors, and the like. The conveyors should be chosen so as to minimize turbulence in the air above the air-freezant vapor interface and to allow free communication between the outside atmosphere and the heat extraction zone. Liquid articles can be introduced through the entrance opening, for example, by running down a trough or duct from which they drip into a freezant bath. After the liquid is frozen, it can be handled as a solid. Liquids which are to be chilled rather than frozen are most readily handled by first sealing them in a container.

Another method of introducing the articles into the heat extraction zone which is suitable for liquids and semi-solids is to pump them in below the interface through a pipe which is not open to the atmosphere. When introducing articles in this way, it is important that the pipe be filled with a continuous stream of the articles whereby essentially no air or other non-condensable gas is introduced below the interface. Introduction of air below the interface causes mixing of air and freezant vapor. Any conventional pump used for food handling can be used for the more fluid articles and suitable extrusion devices can be used for semi-solids such as pastry dough.

After the articles have passed through the heat extraction zone they can be removed from the vessel by passing them upward through the interface and out of the vessel through an exit opening which is in free vapor communication with the heat extraction zone. Turbulence is minimized during the removal of the articles by passing them upward slowly from the interface to the exit opening. Preferably, the articles are passed upward at the same rates specified for passing them from the entrance opening to the interface. As the articles pass upward, the freezant vapor is replaced with air. The conveyors used to remove the articles from the vessel can be any of those mentioned as being suitable for passing solid articles from the entrance opening to the heat extraction zone. Further analogous to the previously described methods of introducing articles into the vessel, articles can be removed from the heat extraction zone and/or the vessel by any means which neither substantially disturbs the air above the interface nor introduces essentially any air below the interface. For example, it has been disclosed that liquids and semi-solids which are to be frozen can be introduced below the interface through a pipe which is not open to the atmosphere. Similarly, articles can be removed from the heat extraction zone and/or the vessel through a pipe. In this case the liquid or semi-solid which provides the seal between the inside of the vessel and the outside atmosphere need not be the articles being treated. Any suitable liquid or semi-solid can be employed to provide the seal, with the treated articles being removed from the heat extraction zone and/or the vessel in or through the liquid or semi-solid.

Freezant vapor losses to the atmosphere can also be increasing the distance between an interface and the outside openings, thereby providing a longer path for freezant vapors escaping by diffusion. The extent to which this vertical dimension is increased will depend upon economic considerations.

Since the amount of freezant vapor moving from an interface into the air above the interface is a function of the area of the interface, freezant vapor losses also tend to be reduced by reducing the horizontal cross-sectional area of the vapor space within the heat extraction vessel. This can be accomplished by filling, or otherwise closing off, all unnecessary vapor space which is traversed by the interface in the heat extraction vessel. Since it is necessary that the vapor condenser cover a rather large horizontal area, the minimum horizontal cross-sectional area of the vapor space within the condenser housing is generally determined by the area occupied by the vapor condenser.

Freezant vapor losses can also be reduced by stabilizing the level of an air-freezant vapor interface. If an interface is constantly rising and falling, increased mixing of air and freezant vapor will result. Also, as an interface rises, air, which may contain relatively large quantities of freezant vapor, is pushed out through the outside openings. The level of an interface can be stabilized by feeding the articles into the heat extraction vessel at a constant rate.

Freezant vapor losses can also be reduced by decreasing the effect of ambient air currents on the air above an interface. This decrease can be accomplished by providing a top cover containing the minimum area of outside opening necessary for proper functioning of the system. Under steady load conditions, the smaller the area of the outside opening, the smaller will be losses by diffusion through the opening. On the other hand, when operating under non-steady load conditions, it is preferable that the area of the opening be large enough that atmospheric air, passing down through the opening as the interface falls, does not enter at a velocity which causes a substantial amount of turbulence in the air above the interface.

In order to provide for equalization of pressure under non-steady load conditions, while at the same time avoiding the turbulence caused by thermal convection and ambient air currents, it is preferred that there be above an interface a quiescent zone containing a quiescent body of air which moves substantially only in response to the vertical movement of the interface, and which has above it a path to the outside atmosphere such as an outside opening which is in free vapor communication with the appropriate interface. By "substantially only in response to the vertical movement of the interface" is meant that there is no substantial movement of air within the quiescent zone due to thermal convection or ambient air currents, the only substantial movement of air being in the vertical direction and substantially in response to the rising and falling of the interface.

When a quiescent zone is of sufficient volume, it has the effect of allowing the system to tolerate substantial variations in the rate at which articles are introduced without markedly increasing freezant vapor losses. A large quiescent zone provides a reservoir of air in its lower region which rises and falls with an interface, but never passes through on outside opening. Because of the substantial absence of mixing in the quiescent zone, the air in the upper region of the zone which passes through the outside opening above the zone when the interface rises contains a relatively low concentration of freezant vapor.

In order to maximize the stabilizing effect of the quiescent body of air above the vapor condenser in the condenser housing, the body of air should have a volume at least about half the volume of the vapor space in the condenser housing between the lowest interface level during operation with no articles being passed through the heat extraction zone and the highest interface level during operation with a maximum rated amount of articles being passed through the heat extraction zone. Most preferably, this quiescent body of air should have a volume at least about equal to the volume of the vapor space between these two levels. When the quiescent body of air is of this size, an added benefit results. It is sufficiently large that when the interface falls from its highest level to its lowest level, the air from the outside atmosphere which is drawn into the quiescent zone never reaches the heat exchange surfaces of the vapor condenser. Thus, even when the outside atmosphere is humid, excessive frosting of the condenser is avoided.

A variety of quiescing means are available which will suppress thermal convection and ambient air currents in a quiescent zone while allowing a body of air to move in response to the vertical movement of an interface. A quiescing means should also allow free vapor communication between the interior of the vessel or housing and the outside atmosphere. Suitable means include appropriate baffles, loosely packed material such as glass wool fibers, and honeycomb structures. It is preferable that the quiescing means limit the general direction of flow in the quiescent zone to the vertical direction without causing any substantial change in velocity or direction as the air moves through the quiescent zone, since these changes tend to cause turbulence. Accordingly, the preferred means for creating quiescence is a vertically standing honeycomb structure which resembles a series of closely packed, relatively small diameter, parallel tubes standing in the vertical direction. Generally, the volume of a quiescent zone is defined by the volume within which the quiescing means are present.

The area of the opening above a quiescent zone is not important provided it is sufficiently large that significant pressure differences do not occur across the opening. Such differences in pressure would cause outside air to pass through the opening at high velocity, thereby causing turbulence. Preferably, the area of an opening above a quiescent zone is at least about $\frac{1}{100}$ of the horizontal cross-sectional area of the vapor space in the quiescent zone.

If the previously-described vapor delivery regulating means is a variable speed blower located in a path to the outside atmosphere above the condenser, there is no separate top cover for the condenser housing and the aforesaid minimum opening area requirement does not apply. A quiescing means in the quiescent zone is preferably provided to minimize the effects of turbulence in the air above the interface. As the release of freezant vapor in the heat extraction zone increases and decreases in accord with freezing system load changes, the output of the variable speed blower is increased or decreased by the control means and air leaves or enters the condenser housing as required to maintain pressure equilibrium with the atmosphere.

The level of the air-freezant vapor interface is generally not the same throughout the heat extraction vessel. For example, when the vessel is subdivided into zones, such as when entrance and exit passageways are present, the level of the interface in the heat extraction zone tends to be below the level of the interface in the entrance and exit zones. These differences in levels result from differences in temperature and resistance to vapor flow in the various zones.

The temperature at any level in the vessel is not necessarily the same in all zones. Since the freezant liquid contact takes place in the heat extraction zone, the temperature in this zone tends to be somewhat lower than the temperature in the entrance and exit zones. The extent to which this difference in temperature exists will be affected by the degree of isolation between the zones, that is, whether entrance and exit passageways are present. The temperature in the entrance zone is further increased by the comparatively warm articles being introduced through it.

Due to the effect of temperature on the density of gases, the warmer gases in the entrance and exit zones will be substantially less dense than the gases in the heat extraction zone. The density of gases at 10–20° C., for example, is only about 80% of the density of the same gases at a typical vapor condenser temperature of −43° C. Since the more dense gases in the heat extraction zone have a higher static pressure head than the less dense gases in the entrance and exit zones the interface level in the heat extraction zone tends to be lower than in the warmer zones. In the present invention, the withdrawal of freezant vapor from the heat extraction vessel makes it possible to maintain the vapor levels in the entrance and exit zones at a low enough level that elevated passageways for the entrance and exit conveyors are not required.

In the present invention, the heat extraction vessel can contain a single outside opening. This single opening can result from there being no top cover on the vessel or a top cover containing a single outside opening. The single opening can be an exit opening when the articles are introduced into the heat extraction zone through a pipe, or it can be an opening through which articles are both introduced and removed.

When solid food is frozen in a covered vessel, it is preferred that there be at least two outside openings, one for introducing the food and the other for removing the food. Because food generally has a substantial moisture content, it is not desirable to pass food into and out of the vessel through the same opening since the water vapor surrounding the food being introduced tends to condense on the frozen food being removed. This results in the formation of an undesirable layer of frost on the frozen food.

When the heat extraction vessel contains a quiescent zone, it is preferable that there be at least two outside openings. It is impractical to use the opening above the quiescent zone for introducing or removing articles because of interference with the quiescing means. Preferably, there are no more than three outside openings since additional openings may increase freezant vapor losses to the atmosphere.

The operation of this invention dose not depend upon any particular method of directly contacting the articles with the liquid freezant. The articles can be contacted, for example, by immersion in a bath of liquid freezant, by being sprayed with liquid freezant, and the like. The heat extraction can be carried out either by continuously contacting the article with the liquid freezant until the desired amount of heat has been removed, or by an interrupted freezing technique in which the article is first contacted with the liquid freezant until only a portion of the desired amount of heat is removed, and then removed from contact with the freezant thereby allowing the icy shell to cold-flow and relieve internal stresses before contact with the liquid freezant is resumed.

In the present invention, the food can be passed through the heat extraction zone using conventional conveying means. Suitable means of moving articles through the heat extraction zone include a stream of liquid freezant, a gas jet moving across the surface of a body of liquid freezant, a mechanical auger, a foraminous belt, and the like. When the first contact between solid food and liquid freezant is to be on a belt conveyor, the conveyor should have a minimum area of contact with the food so that sticking of the food to the conveyor by freezing is minimized. A suitable conveyor for this purpose is a wire mesh conveyor having needle point contact with the food. Wire mesh conveyors having a non-stick coating such as polytetrafluoroethylene are also suitable.

DETAILED DESCRIPTION OF THE DRAWING

In order to illustrate a specific embodiment of this invention, the accompanying figure will be described in terms of use for freezing solid food particles. The food freezing apparatus comprises insulated open freezing vessel 1 which contains entrance zone 2, heat extraction zone 3 and exit zone 4. Food particles 5 are introduced through entrance opening 6 and carried downward into entrance passageway 7 by entrance conveyor 8 which is of wire mesh construction and has cleats 9 of a height and spacing suitable for the food being handled.

Food particles pass downward through air-freezant vapor interface 10 and free-fall into a body of liquid freezant 11 in quick freezing pan 12. As the food is conveyed downward, air in the interstices of the food particles is replaced by heavy freezant vapor. The food particles free-falling from conveyor 8 generally dip down under the surface of the liquid freezant. This results in rapid formation of a frozen crust or shell on the food particles. The particles then rise and float on the surface of the liquid freezant which has a density greater than that of the food. The vigorous boiling action of the freezant, as it is vaporized by the heat extracted, separates the food particles which might otherwise freeze together as they dip down into the freezant. Once the frozen crust is formed on the surface of the food particles, they no longer tend to adhere to one another. The rapid formation of the frozen crust also assures that natural fluids and additives are not lost from the food particles.

The depth of the liquid in pan 12 must be sufficient that food particles free-falling from the conveyor do not contact the bottom of the pan. Liquid freezant is supplied to pan 12 by adjustable circulating pump 13. A steady flow at the surface of the freezant in the pan is caused by baffle 14, thereby insuring rapid movement of food out of the free-fall area toward spill point 15 without recirculation in any part of the pan. By adjusting the length of time the food remains in the pan, the desired degree of freezing can be achieved.

The flow of liquid freezant from pan 12 sweeps the food onto exit conveyor 16 which is also of wire mesh construction and is wider and has higher cleats 17 than entrance conveyor 8, but is otherwise similar. Because the frozen food can now be stacked without sticking together, exit conveyor 16 travels more slowly than entrance conveyor 8. As the frozen food is conveyed upward through air-freezant vapor interface 10 through exit passageway 18 toward exit opening 19, the heavy freezant vapor in the interstices of the food particles is replaced by air and flows downward toward the heat extraction zone. Liquid freezant which drains through the exit conveyor collects in sump 20.

Freezant vapor evolved in freezing pan 12 or elsewhere is withdrawn from freezing vessel 1 through port 21 by variable speed blower 22 for delivery to condenser housing 23 which is also an insulated open vessel. The condenser housing can be above or below the heat extraction vessel at any convenient location to suit the requirements of the installation. The freezant vapor is condensed by parallel finned tube bundle condenser 24. The condenser is the evaporator of a standard refrigeration system using ammonia or a fluorocarbon refrigerant and produces a suitable surface temperature for condensing the freezant vapors. Freezant liquid condensed by vapor condenser 24 is returned to sump 20 by pump 25. Optionally, blower 22 can be located above the condenser in a path to the outside atmosphere.

As the rate at which freezant vapor is evolved varies with the rate at which food is introduced, the level of interface 10 tends to rise and fall. The sampling point of vapor composition analyzer 26 is located in the heat extraction zone at a suitable elevation to permit maintenance of the interface at the desired level as a result of the control of the speed of blower 22 by control system 27.

Loss of freezant vapor from the vapor space in the heat exchanger zone is minimized by retarding thermal convection and ambient air currents in this area. Phenolic resin impregnated paper honeycomb structure 28 is installed above the entire liquid contact area to create a quiescent zone. Dust cover 29 located above the top of the honeycomb structure 28 is provided to reduce entry of air-borne dirt but should not restrict breathing in the honeycomb passages. Spaces above the entrance and exit passageways and adjacent to honeycomb structure 28 are filled by sections of closed-cell insulating material or other impervious barriers as shown at 30 and 31.

The interface level in condenser housing 23 also tends to rise and fall with changes in the rate at which food is introduced into the heat exchange zone. During operation with a maximum rated amount of food being passed through the heat exchange zone, the interface is about ⅔ of the way up the height of condenser 24 as illustrated at level 32. The portion of the condenser above level 32 provides excess condensing surface for surges, upsets, and maldistribution of vapor. Under idling conditions in which no food is being passed through the vessel, the interface is just above the bottom of the condenser as illustrated at level 33.

Loss of freezant vapor from the vapor space above the condenser is minimized by retarding thermal convection and ambient air currents in this area. Phenolic resin impregnated paper honeycomb structure 34 is installed above the entire condenser area to create a quiescent zone. Dust cover 35, located above the top of the honeycomb structure 34, is provided to reduce entry of air-borne dirt but does not restrict breathing in the honeycomb passages. If blower 22 is located in the optional position above the condenser, there usually is no separate dust cover over the top of the condenser housing.

The freezing of high moisture content foods, especially when they have been cut or sliced, or the immediate freezing of foods which have been blanched or otherwise treated with aqueous brines, as is commonly practiced, may result in a high moisture intake into the freezing vessel. The vapor of the preferred freezant, dichlorodifluoromethane, forms a crystalline or semi-solid hydrate in the presence of water vapor at temperatures between about 0° C. and 7° C. If this hydrate forms on the food during the freezing process, then during thawing it may impart an unattractive frothy appearance to the food resulting from decomposition of the hydrate to dichlorodifluoromethane vapor and water.

Fouling of condenser 24 by ice or hydrate will reduce the efficiency of the condenser and may limit the length of operation of the process by making it necessary to shut down periodically for servicing. If desired, the condenser can be divided into sections, some of which can be heated by internal hot gas flow for removal of ice or hydrate while the other sections continue in service. Some of the sections can also be taken out of service during periods of idling operation.

Because the condenser is located in a separate housing in the present invention, it is possible to clean either the condensing or the freezing section of the apparatus without allowing the other section to heat up Moreover, as a result of this arrangement, interruptions in the freezing process for effecting cleaning are minimized.

When the freezing operation is first started up, air is displaced from the heat exchange zone and condenser housing by freezant vapor entering vessel 1 from any convenient source such as bulk storage tank or shipping cylinder 36 before vapor condenser 24 is cooled to the operating temperature. In this manner moist air is removed from the area of the condenser without the formation of frost on the heat exchange surfaces. When the freezant vapor level reaches the top of vapor condenser 24, the temperature of the condenser is lowered to below the boiling point of the liquid freezant. Freezant then is introduced into the vessel as liquid or vapor, preferably as liquid. The freezing of food is commenced when sufficient liquid freezant is present to establish liquid flow through pump 13 and freezing pan 12. Any excess water or other liquid introduced with the food at entrance opening 6 passes through entrance conveyor 8 into cleanout area 37 and is discharged through drain valve 38.

For servicing the equipment or at the end of a freezing operation, freezant is removed from the freezing vessel by drain pump 39. The freezant is pumped into storage vessel 40 which is of sufficient capacity to hold, as a liquid, all of the freezant in the freezing system and which is designed to withstand the pressure developed when the freezant reaches ambient temperature. Storing vessel 40 can be above or below the bottom of the freezing vessel.

When the freezing operation is resumed after an extended shutdown, air is displaced from the heat exchange zone and condenser housing by freezant vapor passing from storage vessel 40 through return valve 41 before vapor condenser 24 is cooled to the operating temperature. When the freezant vapor level reaches the top of vapor condenser 24 the temperature of the condenser is adjusted to below the boiling point of the liquid freezant. When all the liquid freezant in vessel 40 has been vaporized, any sludge or residue remaining in the vessel can be removed through drain valve 42. Make-up freezant is then supplied from storage tank 36, as required. The aforesaid sludge or residue remaining in vessel 40 is of two types, namely, that which is soluble in freezant and that which is insoluble. If desired the latter can be removed from the freezant between the time it leaves sump 20 and enters vessel 40. For example, a coarse filter can be installed between pump 39 and vessel 40 to remove filterable solids.

All parts of the freezing apparatus which come in contact with the food should be made of materials capable of being cleaned by methods normally used for cleaning food handling equipment. Entrance conveyor 8 can be cleaned during operation whenever ice or food debris accumulates on the conveyor belt. A suitable detergent solution is sprayed on the return flight of the conveyor by spray manifold 43 thereby dislodging debris which is drained from the housing through valve 38. Air manifold 44 can be used to blow air through the conveyor belt thereby removing water from the belt before food is placed on it.

Variable speed blower 22 can be controlled manually to withdraw quickly all freezant vapor from the freezing vessel, and auxiliary vapor ports (not shown) can be provided for removal of freezant vapor from sump 20 when the freezing vessel is to be cleaned. Additional sampling points (now shown) can be provided for vapor composition analyzer 26 to monitor the interface level in condenser housing 23 so that freezant vapor is not forced out of the housing by excessive blower speed. Blower 22 can also be controlled manually when freezant vapor flow is being established or re-established. Unless blower 22 is in the optional position above the condenser, air from the freezing vessel can be diverted from the entry of the condenser housing by a waste valve (not shown) when freezant vapor flow is re-established after cleaning of the freezing vessel. A sampling point for the vapor composition analyzer can be provided at the waste valve adjacent to the condenser housing to ascertain that freezant vapor flow has been re-established before the entrance to the condenser housing is reopened.

The embodiments of the invention in which an exclusive property or privilege is claimed are defined as follows:

1. A method of extracting heat from articles by direct contact with an ebullient liquid freezant in an open heat extraction vessel without significant loss of freezant vapor to the atmosphere by (A) maintaining an ebullient, liquid, polyfluorinated, $C_1$ to $C_4$, saturated halohydrocarbon freezant in a heat extraction zone of the vessel, said freezant having a normal boiling point of 5° to −50° C. and a vapor density at its normal boiling point of at least twice that of air at the same temperature, (B) controllably conducting freezant vapor from the heat extraction zone to a remotely-positioned, open housing containing a vapor condensing means, (C) maintaining a non-condensable gas-freezant vapor interface in the vessel and in the housing by operating the vapor condensing means in the housing at a temperature below the normal boiling point of the liquid freezant, the level of the interface in the vessel being below the level of all paths to the outside atmosphere which are in free vapor communication with the heat extraction zone but above the level at which the articles come in direct contact with the liquid freezant, and the level of the interface in the housing being below the level of all paths to the outside atmosphere from the interior of the housing, (D) introducing articles selected from the group consisting of liquids and solids which are at a temperature above the normal boiling point of the liquid freezant into the heat extraction zone without substantially disturbing the non-condensable gas immediately above the interfaces and without introducing any significant amount of non-condensable gas below the interfaces, (E) passing the articles through the heat extraction zone, (F) extracting heat from the articles in the heat extraction zone by direct contact with the liquid freezant, and (G) removing the articles from the vessel through an exit opening without substantially disturbing the non-condensable gas above the interfaces and without introducing essentially any non-condensable gas below the interfaces.

2. The method of claim 1 in which the freezant is dichlorodifluoromethane.

3. The method of claim 1 in which the heat is extracted from the articles by an interrupted freezing technique.

4. The method of claim 1 in which the non-condensable gas is air.

5. The method of claim 1 in which the vapor condensing means is a vapor condenser, the top of which is below the level of all paths to the outside atmosphere.

6. The method of claim 5 which also comprises maintaining a quiescent zone above the heat extraction zone and a quiescent zone above the condenser, each quiescent zone containing a quiescent body of non-condensable gas which moves substantially only in response to the vertical movement of the corresponding interface, each quiescent zone having above it a path to the outside atmosphere which is in free vapor communication with the corresponding interface through the quiescent zone.

7. The method of claim 6 in which the quiescent body of non-condensable gas in the quiescent zone above the condenser has a volume at least half the volume of the vapor space in the condenser housing between the lowest interface level during operation with no articles being passed through the heat extraction zone and the highest interface level during operation with a maximum rated amount of articles being passed through the heat extraction zone.

8. The method of claim 7 in which the quiescent body of non-condensable gas in the quiescent zone above the condenser has a volume at least equal to the volume of the vapor space between the lowest interface level during operation with no articles being passed through the heat extraction zone and the highest interface level during operation with a maximum rated amount of articles being passed through the heat extraction zone.

9. The method of claim 8 in which the path to the outside atmosphere from above a quiescent zone is an outside opening, the area of said outside opening being at least 1/100 the horizontal cross-sectional area of the vapor space in the quiescent zone.

10. The method of claim 9 in which the articles are introduced into the heat extraction zone by being pumped in below the interface in the vessel through a pipe which is not open to the atmosphere, and are removed from the vessel by passing them from the interface in the vessel to the exit opening at a speed not in excess of 100 feet (30.48 meters) per minute.

11. The method of claim 9 in which the articles are introduced into the heat extraction zone by first introducing them into the vessel through an entrance opening which is in free vapor communication with the heat extraction zone, and then passing them downward from the entrance opening through the interface into the heat extraction zone, said articles moving from the entrance opening to the interface at a speed not in excess of 100 feet (30.48 meters) per minute, and are removed from the vessel by passing them from the interface in the vessel to the exit opening at a speed not in excess of 100 feet (30.48 meters) per minute.

12. The method of claim 11 in which the articles are introduced into the heat extraction zone by passing them through an entrance passageway from the entrance opening to the interface at a speed of less than 50 feet (15.24 meters) per minute, and are removed from the vessel by passing them through an exit passageway from the interface to the exit opening at a speed of less than 50 feet (15.24 meters) per minute.

13. The method of claim 12 in which the articles are solid food and the freezant has a vapor density at its normal boiling point at least three times that of air at the same temperature.

14. The method of claim 13 in which the freezant is dichlorodifluoromethane.

15. Heat extraction apparatus which comprises
   (A) an open vessel and a remotely-positioned open housing for a vapor condensing means,
   (B) a heat extraction zone within the vessel and containing a liquid freezant having a normal atmospheric boiling point less than ambient temperature,
   (C) means for introducing articles into the heat extraction zone,
   (D) means for conveying the articles through the heat extraction zone,
   (E) means within the heat extraction zone for causing the articles to come in direct contact with the liquid freezant, thereby generating freezant vapor,
   (F) means for conducting freezant vapor from the heat extraction zone to the vapor condenser housing,
   (G) vapor condensing means within the vapor condenser housing for maintaining a non-condensable gas-freezant vapor interface in the vessel and in the housing, said means being of sufficient size to condense substantially all the freezant vaporized in the heat extraction zone and conducted to the housing, the top of said means being below the level of all paths to the outside atmosphere from the interior of the housing,
   (H) vapor composition sensing means in the heat extraction zone for determining the level of the non-condensable gas-freezant vapor interface and for regulating the output of a vapor delivery regulating means;
   (I) vapor delivery regulating means operably connected to the vapor composition sensing means and the vapor conducting means for controllably conducting vapor through the vapor conducting means;
   (J) means for returning liquid freezant from the housing to the heat extraction zone, and
   (K) means for conveying the articles out of the vessel from the heat extraction zone.

16. The apparatus of claim 15 in which the means for causing the articles to come in direct contact with the liquid freezant provides interrupted contact.

17. The apparatus of claim 15 which also includes above the heat extraction zone and above the vapor condensing means a quiescing means which provides a quiescent zone and which allows vapor movement in the quiescent zone in substantially only the vertical direction, and above each quiescent zone a path to the outside atmosphere which is in free vapor communication with the corresponding interface through the quiescent zone.

18. The apparatus of claim 17 in which the path to the outside atmosphere from above a quiescent zone is an outside opening, the area of said outside opening being at least $\frac{1}{100}$ the horizontal cross-sectional area of the vapor space in the quiescent zone, and the quiescing means is a vertical standing honeycomb structure.

19. The apparatus of claim 18 in which the means for introducing the articles into the heat extraction zone is a pump communicating with the heat extraction zone through a pipe.

20. The apparatus of claim 18 in which the means for introducing the articles into the heat extraction zone is an entrance opening which is in free vapor communication with the heat extraction zone and means for conveying the articles downward from the entrance opening to the heat extraction zone.

21. The apparatus of claim 20 which also includes an entrance passageway from the entrance opening to the heat extraction zone, and an exit passageway from the heat extraction zone to the exit opening.

References Cited
UNITED STATES PATENTS 3,498,069    3/1970    Waldin _____ 62—63

MEYER PERLIN, Primary Examiner
R. C. CAPOSSELA, Assistant Examiner

U.S. Cl. X.R.
62—375